(12) United States Patent
Homison et al.

(10) Patent No.: US 10,851,704 B2
(45) Date of Patent: Dec. 1, 2020

(54) SYSTEMS AND METHODS FOR INCREASING POWER OUTPUT IN A WASTE HEAT DRIVEN AIR BRAYTON CYCLE TURBOCHARGER SYSTEM

(71) Applicant: Transportation IP Holdings, LLC, Norwalk, CT (US)

(72) Inventors: Christopher Joseph Homison, Wattsburg, PA (US); Lukas Johnson, Erie, PA (US); Daniel Edward Loringer, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/221,306

(22) Filed: Dec. 14, 2018

(65) Prior Publication Data
US 2020/0191048 A1 Jun. 18, 2020

(51) Int. Cl.
*F02B 37/20* (2006.01)
*F01K 23/10* (2006.01)
(Continued)

(52) U.S. Cl.
CPC ............ *F02B 37/20* (2013.01); *F01K 23/101* (2013.01); *F02B 37/007* (2013.01);
(Continued)

(58) Field of Classification Search
CPC .... F02B 37/007; F02B 37/001; F02B 37/013; F02C 6/18; F02C 6/12; F02C 3/36;
(Continued)

(56) References Cited

U.S. PATENT DOCUMENTS 2,651,174 A * 9/1953 Bolsezian ................. F02C 1/08
  60/39.183
2,654,216 A * 10/1953 Traupel ..................... F02C 9/28
  60/773
(Continued)

FOREIGN PATENT DOCUMENTS

CN  108291498 A  7/2018
DE  2609390 A1 * 9/1977 .............. F02B 37/10
(Continued)

OTHER PUBLICATIONS

"Clean Diesel Engine Component Improvement Program—Diesel Engine Waste Heat Recovery—Utilizing Electric Turbocompound Technology," DOE Final Report 2004 DE-FC05-00OR22810, Office of Scientific and Technical Information Website, Available Online at https://www.osti.gov/servlets/purl/862432, Dec. 17, 2004, 14 pages.
(Continued)

*Primary Examiner* — Hoang M Nguyen
(74) *Attorney, Agent, or Firm* — McCoy Russell LLP

(57) ABSTRACT

Various systems and methods are provided for a turbocharger system. In one example, system for use with a power generator having a rotary machine including a combustor comprises: a heat exchanger positioned to receive exhaust gases from the combustor; and a turbocharger system, comprising: a low pressure turbocharger including a low pressure turbine adapted to receive gas flow from the heat exchanger and a low pressure compressor adapted to supply compressed air to the heat exchanger; a high pressure turbocharger including a high pressure turbine adapted to receive gas flow from the heat exchanger and a high pressure compressor adapted to receive gas flow from the low pressure compressor and supply compressed air to the rotary machine; and a second combustor adapted to inject exhaust gases into a flow path arranged between the heat exchanger
(Continued)

and an inlet to each of the high pressure turbine and the low pressure turbine.

18 Claims, 7 Drawing Sheets

(51) Int. Cl.
| | |
|---|---|
| *F02B 37/013* | (2006.01) |
| *F02B 37/10* | (2006.01) |
| *F02C 6/18* | (2006.01) |
| *F02G 5/02* | (2006.01) |
| *F02B 37/007* | (2006.01) |

(52) U.S. Cl.
CPC .......... *F02B 37/013* (2013.01); *F02B 37/10* (2013.01); *F02C 6/18* (2013.01); *F02G 5/02* (2013.01); *F02G 2250/03* (2013.01)

(58) Field of Classification Search
CPC .. F02C 3/365; F02C 7/10; F02C 7/143; F02C 3/30; F01K 23/10; F01K 23/101; F02G 2250/03; Y02E 20/14; Y02E 20/16; F05D 2260/213; F05D 2220/60; F05D 2220/40; F05D 2260/211
USPC ..................................... 60/39.182, 605.1–612
See application file for complete search history.

(56) References Cited

U.S. PATENT DOCUMENTS

| | | | | |
|---|---|---|---|---|
| 2,658,336 | A * | 11/1953 | Traupel | F02C 7/36 60/39.183 |
| 2,664,957 | A * | 1/1954 | Catford | F02B 37/14 416/34 |
| 3,788,066 | A | 1/1974 | Nebgen | |
| 4,751,814 | A * | 6/1988 | Farrell | F02C 1/04 60/39.183 |
| 4,785,621 | A * | 11/1988 | Alderson | C10J 3/16 60/39.12 |
| 5,442,904 | A * | 8/1995 | Shnaid | F02C 6/18 60/39.183 |
| 5,680,764 | A | 10/1997 | Viteri | |
| 6,350,394 | B1 | 2/2002 | Ennis et al. | |
| 6,546,736 | B2 * | 4/2003 | Rakhmailov | F02C 6/006 60/39.183 |
| 6,772,582 | B2 * | 8/2004 | Reissig | F02C 1/04 60/39.183 |
| 7,174,714 | B2 | 2/2007 | Algrain | |
| 9,388,737 | B2 * | 7/2016 | Kraft | F02C 3/10 |
| 2003/0049139 | A1 * | 3/2003 | Coney | F02B 33/34 417/243 |
| 2007/0256424 | A1 * | 11/2007 | Briesch | F02C 6/18 60/773 |
| 2011/0239643 | A1 * | 10/2011 | LeJeune | F01K 23/065 60/598 |
| 2014/0137563 | A1 * | 5/2014 | Kerth | F02C 6/16 60/772 |

FOREIGN PATENT DOCUMENTS

| | | | | |
|---|---|---|---|---|
| DE | 19960762 A1 * | 6/2001 | ........... | F01N 3/0205 |
| DE | 102018005821 B3 * | 5/2019 | ......... | F02M 25/0228 |
| EP | 1408224 A1 * | 4/2004 | ............. | F02B 33/32 |
| GB | 2511652 A | 9/2014 | | |
| WO | 9001624 A1 | 2/1990 | | |
| WO | WO-9212335 A1 * | 7/1992 | ........... | F02B 37/004 |
| WO | 2017098251 A1 | 6/2017 | | |

OTHER PUBLICATIONS

Hopmann, U., "Diesel Engine Waste Heat Recovery Utilizing Electric Turbocompound Technology," Proceedings of the 2004 DEER Conference, Aug. 30, 2004, San Diego, California, 20 pages.
Gödeke, H. et al., "Hybrid Turbocharger with Innovative Electric Motor," MTZ Worldwide, vol. 75, No. 3, Mar. 2014, 6 pages.
Shiraishi, K. et al., "Electro-Assist Turbo for Marine Turbocharged Diesel Engines," Proceedings of ASME Turbo Expo 2014: Turbine Technical Conference and Exposition, Jun. 16, 2014, Dusseldorf, Germany, 8 pages.
Homison, C. et al., "Systems and Methods for Increasing Power Output in a Waste Heat Driven Air Brayton Cycle Turbocharger System," U.S. Appl. No. 16/221,273, filed Dec. 14, 2018, 58 pages.
Homison, C. et al., "Systems and Method for a Waste Heat-Driven Turbocharger System," U.S. Appl. No. 16/220,389, filed Dec. 14, 2018, 38 pages.
Homison, C. et al., "Turbocharger Systems and Method for Capturing a Process Gas," U.S. Appl. No. 16/276,177, filed Feb. 14, 2019, 37 pages.

* cited by examiner

SYSTEMS AND METHODS FOR INCREASING POWER OUTPUT IN A WASTE HEAT DRIVEN AIR BRAYTON CYCLE TURBOCHARGER SYSTEM

BACKGROUND

Technical Field

Embodiments of the subject matter disclosed herein relate to turbocharger systems for use with a rotary machine.

Discussion of Art

Some rotary machines, such as some gas turbine engines, include a compressor, a combustor, and a turbine coupled in a serial flow relationship. More specifically, the compressor receives ambient air (e.g., via an intake) and discharges compressed air. The compressed air is then mixed with fuel and ignited in the combustor to produce a high energy gas stream. The high energy gas stream flows through the turbine to rotatably drive the turbine. The compressor and turbine are coupled through a shaft to form a rotor assembly, such that rotation of the turbine drives the compressor and a load coupled to the shaft.

A power output of such rotary machines is limited by a mass flow rate of working fluid (e.g., air) through the rotary machine. For example, a compressor intake mass flow of the rotary machine is decreased during high temperature ambient conditions due to a decrease in ambient air density, limiting the power output of the rotary machine in such ambient conditions. In addition, in at least some rotary machines, air is extracted from the compressor and used for purposes other than combustion. The extracted air is used, for example, to cool components of the turbine exposed to the high energy gas stream, which is hot. However, as a quantity of air extracted from the compressor for cooling or other purposes increases, an efficiency of the rotary machine decreases. Therefore, in some examples, a turbocharger system is provided to inject additional air into the rotary machine, thereby increasing the efficiency of the rotary machine.

As another example, a temperature of the air through the rotary machine may limit the power output of the rotary machine due to the need to maintain a temperature at the inlet of the turbine within temperature thresholds that are dependent on the materials of the turbine. In such an example, injection of additional air from the turbocharger system that is at a lower temperature enables additional fueling of the combustor to increase the power output.

BRIEF DESCRIPTION

In one embodiment, a power generation system includes a rotary machine including a first combustor and an exhaust passage flowing exhaust gases from the first combustor; a heat exchanger positioned in the exhaust passage; and a turbocharger system, comprising: at least one low pressure turbocharger including a low pressure turbine fluidly coupled to an outlet of the heat exchanger, the low pressure turbine adapted to receive gas flow from the heat exchanger, and a low pressure compressor fluidly coupled to an inlet of the heat exchanger, the low pressure compressor adapted to supply compressed air to the heat exchanger; at least one high pressure turbocharger including a high pressure turbine fluidly coupled to the outlet of the heat exchanger, the high pressure turbine adapted to receive gas flow from the heat exchanger, and a high pressure compressor fluidly coupled to the rotary machine, the high pressure compressor adapted to receive gas flow from the low pressure compressor and supply compressed air to the rotary machine; and an auxiliary, second combustor adapted to inject heated exhaust gases into a first flow path arranged between the outlet of the heat exchanger and an inlet to each of the high pressure turbine and the low pressure turbine.

DETAILED DESCRIPTION

Figure 1:
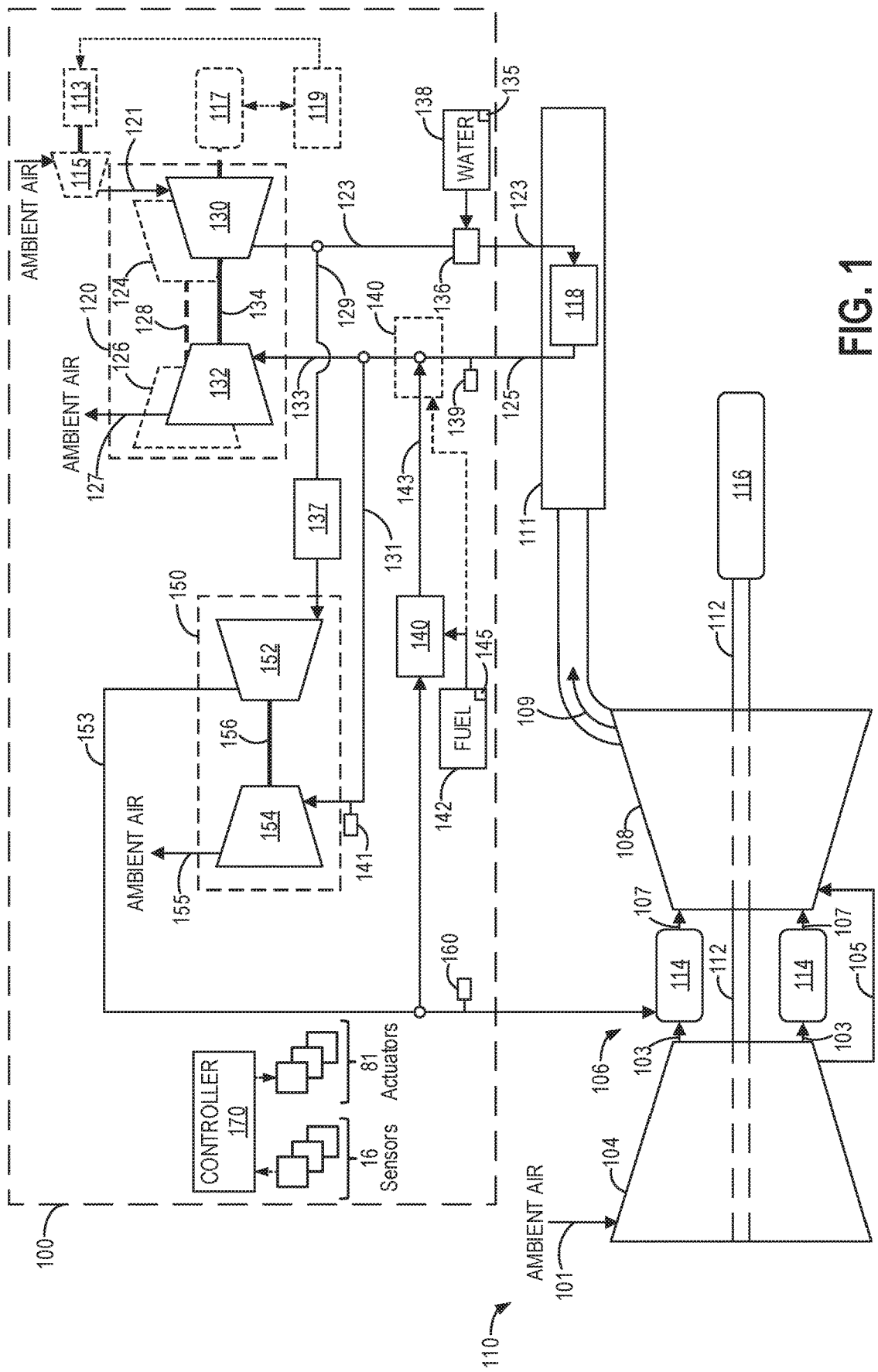
FIG. 1 shows a schematic representation of an exemplary rotary machine coupled to a first exemplary turbocharger system, according to an embodiment of the invention.

The following description relates to embodiments of a system for use with a power generator having a rotary machine including a first combustor and an exhaust passage flowing exhaust gases from the first combustor, including: a heat exchanger positioned in the exhaust passage; and a turbocharger system, comprising: at least one low pressure turbocharger including a low pressure turbine fluidly coupled to an outlet of the heat exchanger, the low pressure turbine adapted to receive gas flow from the heat exchanger, and a low pressure compressor fluidly coupled to an inlet of the heat exchanger, the low pressure compressor adapted to supply compressed air to the heat exchanger; at least one high pressure turbocharger including a high pressure turbine fluidly coupled to the outlet of the heat exchanger, the high pressure turbine adapted to receive gas flow from the heat exchanger, and a high pressure compressor fluidly coupled to the rotary machine, the high pressure compressor adapted to receive gas flow from the low pressure compressor and supply compressed air to the rotary machine; and an auxiliary, second combustor adapted to inject heated exhaust gases into a first flow path arranged between the outlet of the heat exchanger and an inlet to each of the high pressure turbine and the low pressure turbine. In one example, the system may further include a controller configured to adjust a fueling rate of fuel supplied to the second combustor based on a desired power output of the rotary machine and/or a desired output of the turbocharger system. In another example, the system may further comprise a water injection system adapted to inject water into a gas flow path between the low pressure compressor and the inlet of the heat exchanger, the controller further configured to adjust a rate of water injected by the water injection system. As such, the turbocharger system may comprise a waste heat-driven air Brayton cycle turbocharger system configured to inject air into the combustor of the rotary machine at a controllable operating point.

For example, exhaust gases from the turbine of the rotary machine, generated at the combustor, may flow to the heat exchanger, where waste heat from the exhaust gases is transferred to compressed air received at the heat exchanger from the low pressure compressor. The heated compressed air is discharged from the heat exchanger and flows to the low pressure turbine and the high pressure turbine. The heated compressed air imparts a rotational force on each turbine, which drives the corresponding compressor to generate compressed air. The low pressure compressor and the high pressure compressor may be coupled in series with intercooling in between such that ambient air received by the low pressure compressor is compressed over two compression stages before being discharged from the high pressure compressor. The compressed air discharged from the high pressure compressor may be injected at the rotary machine as auxiliary compressed air, such as to increase a power output of the rotary machine.

Traditionally, the turbocharger system operates at an equilibrium point based on a flow rate and a temperature of the exhaust gases of the rotary machine and a flow rate and pressure of the auxiliary compressed air generated by the waste turbocharger system, which is further influenced by ambient conditions (e.g., ambient temperature and pressure). A relatively high flow rate of compressed air from the low pressure compressor is needed to extract sufficient waste heat at the heat exchanger to drive a desired flow of auxiliary compressed air for increasing the power output and efficiency of the rotary machine. The equilibrium point cannot be adjusted with a fixed waste heat-driven air Brayton cycle loop, resulting in lower than desired turbocharger system output and rotary machine power output.

However, the embodiments described herein enable the output of the turbocharger system, and thus the rotary machine, to be adjusted by including the second combustor and/or the water injection system, enabling the operating point of the turbocharger system to be increased from the equilibrium point. For example, the controller may actively operate the second combustor and/or the water injection system based on the desired output of the turbocharger system (e.g., a desired pressure and/or flow rate of the auxiliary compressed air to inject at the rotary machine) and/or the desired power output of the rotary machine. As one example, the water injection system may be actuated to add mass to the heated compressed air received at the low pressure turbine and the high pressure turbine without adding to compressor work while increasing an efficiency of heat extraction at the heat exchanger. For example, a required flow capacity (and, correspondingly, a size and cost) of the low pressure compressor and the low pressure turbine at the equilibrium point of the turbocharger system may be reduced for the same output of the turbocharger system by using the water injection system. This is a result of additional turbine power generated by the low pressure turbine due to a combination of the added mass flow of the water (which did not have to be compressed by the low pressure compressor) and the more efficient heat extraction from the heat exchanger by the thermodynamic effects of the more favorable heat absorbing properties of the heat exchanger gas stream with the water present and a lower entrance temperature caused by the water vaporizing after being injected. Further, the rate of the water injected by the water injection system may be varied to adjust the output of the turbocharger system, and thus the power output of the rotary machine. As another example, the controller may actively operate the second combustor to supply supplemental heat to drive the low pressure turbine and high pressure turbine, thus increasing the output of the turbocharger system and the power output of the rotary machine. A fueling rate of fuel supplied to the second combustor may be varied to adjust the output of the turbocharger system, and thus the power output of the rotary machine, to a desired operating point. In embodiments of the turbocharger system that include both the water injection system and the second combustor, the water injection system and the second combustor may be used in combination to extend an operating range of the second combustor, which is limited by a pre-turbine temperature. By actively controlling the turbocharger system output via the water injection system and/or the second, auxiliary combustor, the power output of the rotary machine may be increased while a size and cost of components of the turbocharger system may be reduced.

Figure 2:
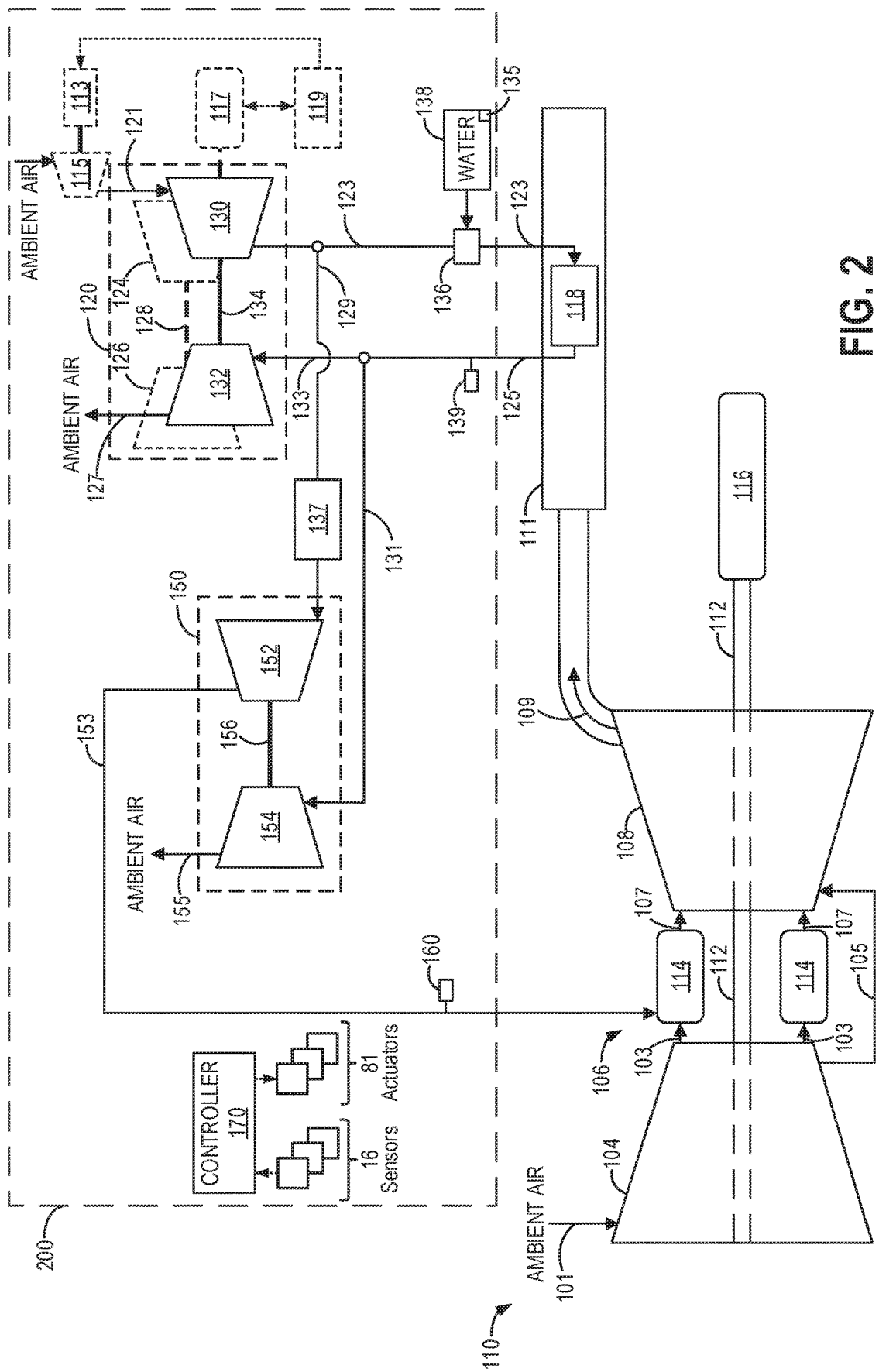
FIG. 2 shows a schematic representation of an exemplary rotary machine coupled to a second exemplary turbocharger system, according to an embodiment of the invention.
Figure 3:
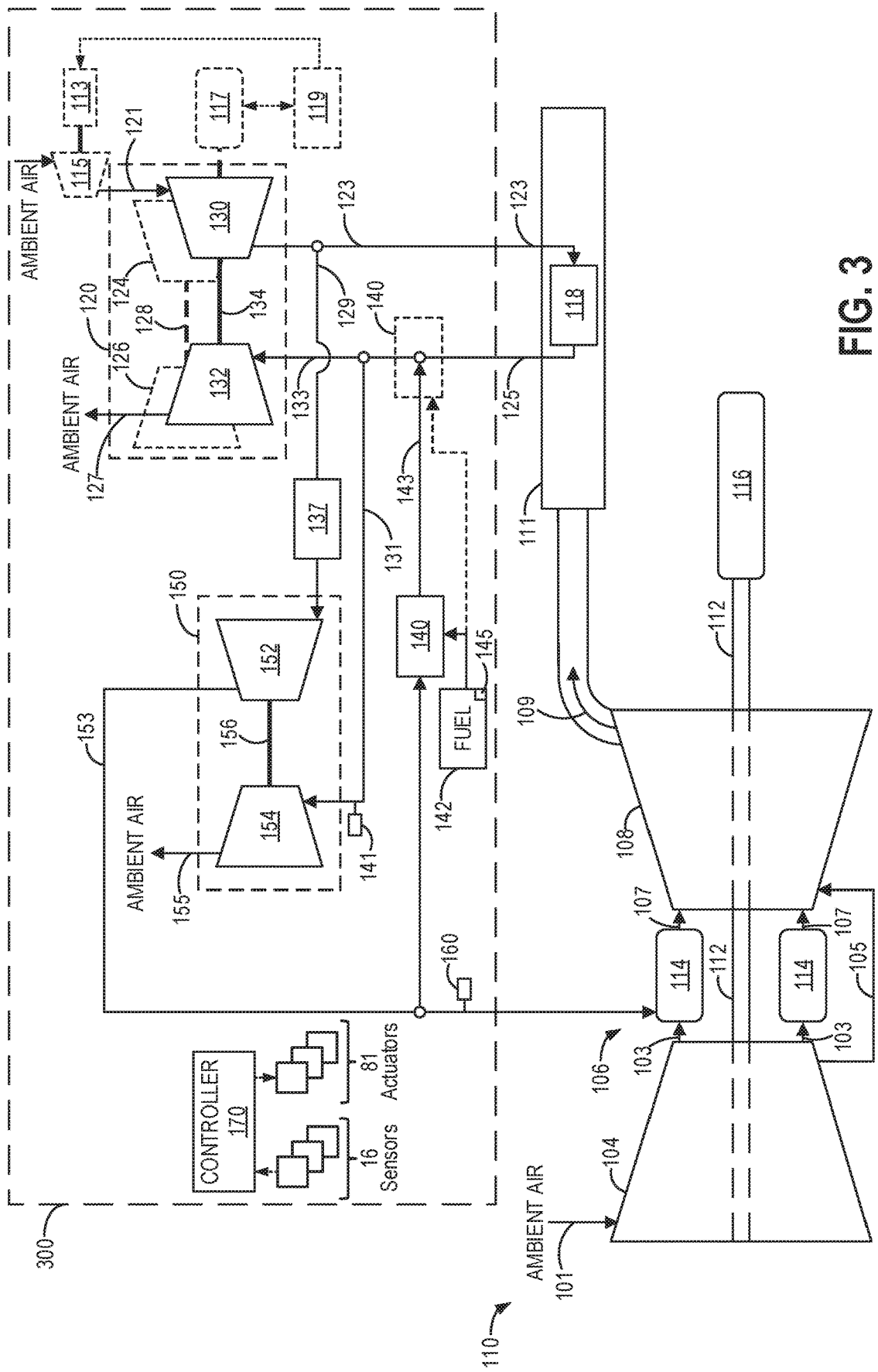
FIG. 3 shows a schematic representation of an exemplary rotary machine coupled to a third exemplary turbocharger system, according to an embodiment of the invention.

FIG. 1 shows a first exemplary embodiment of a waste heat-driven air Brayton cycle turbocharger system coupled to a rotary machine, the first exemplary embodiment including a water injection system and an auxiliary combustor for increasing an output of the turbocharger system (and thus, an output of the rotary machine). FIGS. 2 and 3 show a second and third exemplary embodiment, respectively, of a waste heat-driven air Brayton cycle turbocharger system coupled to the rotary machine, the second embodiment including the water injection system (and not the auxiliary combustor) and the third exemplary embodiment including the auxiliary combustor (and not the water injection system). The first, second, and third exemplary embodiments may each include a controller configured to operate the water injection system and/or the auxiliary combustor to increase a pressure and/or flow rate of auxiliary compressed air output by the turbocharger system and provided to the rotary machine, such as according to the method of FIG. 4. In particular, in embodiments that include both the water injection system and the auxiliary combustor, such as the first exemplary embodiment of FIG. 1, the controller may make a determination of whether to increase the output of the turbocharger system via auxiliary combustor, the water injection system, or both, such as according to the sub-method of FIG. 5. In embodiments that include the water injection system (e.g., the first exemplary embodiment of FIG. 1 or the second exemplary embodiment of FIG. 2), the controller may control a rate of water injection by the water injection system to achieve a desired output, such as according to the sub-method of FIG. 6. In embodiments that include the auxiliary combustor and not the water injection system (e.g., the third exemplary embodiment of FIG. 3), the controller may control a fueling rate of fuel supplied to the auxiliary combustor to achieve a desired output, such as according to the sub-method of FIG. 7.

Referring to FIG. 1, a schematic depiction of a first exemplary turbocharger system 100 coupled to an exemplary rotary machine 110 is shown. In the depicted embodiment, the rotary machine is a boosted gas turbine engine, receiving boost air from the first turbocharger system, as will be further described below. In other embodiments, the rotary machine may be any other turbine engine and/or rotary machine, including, but not limited to, a gas turbofan aircraft engine or other aircraft engine. The rotary machine includes a compressor section 104, a combustor section 106 coupled downstream from compressor section, a turbine section 108 coupled downstream from the combustor section, and an exhaust section 111 coupled downstream from the turbine section. The turbine section is coupled to the compressor section via a rotor (e.g., shaft) 112. The rotor is further coupled to a load 116, which may be an electrical generator and/or a mechanical drive application, for example. Note that, as used herein, the term "couple" is not limited to a direct mechanical, electrical, and/or communication connection between components, but may also include an indirect mechanical, electrical, and/or communication connection between multiple components.

During operation, ambient (intake) air 101 is received by the compressor section. The compressor section compresses the received intake air and discharges compressed air 103, also referred to as compressor discharge casing (CDC) air herein. The CDC air is channeled into the combustor section. In the illustrated embodiment, the combustor section includes a plurality of combustors 114, and the combustor section is coupled to the compressor section such that each of the combustors receives the CDC air from the compressor section. In the combustors, the CDC air is mixed with fuel and ignited to generate high temperature combustion gases 107. The combustion gases are channeled into the turbine section and impart a rotational force on the rotor, which drives the compressor section and the load 116. The combustion gases are exhausted from the turbine section as exhaust gases 109, which are channeled into the exhaust section. The exhaust gases retain residual heat, such that the exhaust gases are at an exhaust temperature above a temperature of the ambient air.

In some embodiments, a compressor extraction flow 105 is additionally extracted from the compressor section and diverted away from the combustor section. For example, in the illustrated embodiment, the compressor extraction flow is channeled directly (that is, not through the combustors) to the turbine section and used to cool components of the turbine section exposed to the hot combustion gases. In other embodiments, the compressor extraction flow is channeled to any other suitable use or combination of uses apart from combustion in the combustors. However, removal of the compressor extraction flow from the working fluid path through the rotary machine reduces an efficiency of the rotary machine. That is, as a quantity of the compressor extraction flow increases relative to the CDC air, the efficiency of the rotary machine correspondingly decreases.

Therefore, the first turbocharger system 100 is configured to provide auxiliary compressed air 153 (also referred to as "CDC boost air") to the rotary machine to reduce or prevent the decrease in the efficiency of the rotary machine. Specifically, the auxiliary compressed air is input into the combustors 114, supplementing the CDC air from the compressor section. For example, the auxiliary compressed air may at least partially replace or even exceed the quantity of the compressor extraction flow diverted from the combustor section.

In the embodiment shown in FIG. 1, the first turbocharger system 100 includes a low pressure turbocharger (LPT) stage 120 and a high pressure turbocharger (HPT) stage 150 coupled downstream from the LPT stage. The LPT stage includes one or more low pressure turbochargers, including a LPT compressor 130 rotationally coupled to a LPT turbine 132 via a LPT rotor 134. In some embodiments, the LPT stage may include a bank of low pressure turbochargers. For example, FIG. 1 optionally shows a second LPT compressor 124 coupled to a second LPT turbine 126 via a second LPT rotor 128. In embodiments where the LPT stage includes multiple low pressure turbochargers, the low pressure turbochargers may be smaller in size than when a single low pressure turbocharger is included. The multiple low pressure turbochargers may be coupled in series or in parallel with one another. The HPT stage includes one or more high pressure turbochargers, including a HPT compressor 152 rotationally coupled to a HPT turbine 154 via a rotor 156. However, in other embodiments, the first turbocharger system includes any suitable number of turbochargers. For example, in some embodiments, the first turbocharger system may include a medium pressure turbocharger (MPT) stage coupled between the LPT compressor and the HPT compressor, with a MPT turbine of the MPT stage in series or in parallel with the HPT turbine. The MPT stage may enable downsizing of the high pressure turbocharger, for example. Additionally, a further efficiency increase of the turbocharger system may be obtained by including the MPT stage with intercooling in between each compression stage.

In the exemplary embodiment, the LPT rotor and the HPT rotor are each not coupled to the rotor of the rotary machine. Thus, each of the one or more low pressure turbochargers and the one or more high pressure turbochargers is operable at a speed independent of a speed of the rotor of the rotary machine. In some such embodiments, the one or more low pressure turbochargers and the one or more high pressure turbochargers are operated at relatively high speeds compared to the rotor of the rotary machine, such that a size of the one or more low pressure turbochargers and the one or more high pressure turbochargers for producing a selected amount of compressed air is correspondingly reduced.

Moreover, in the exemplary embodiment, the LPT rotor and the HPT rotor are not coupled to each other, such that the one or more low pressure turbochargers and the one or more high pressure turbochargers are operable at speeds independent of each other. In some such embodiments, operating the one or more low pressure turbochargers and the one or more high pressure turbochargers at independent speeds helps maintain a selected work load distribution between the LPT stage and the HPT stage, for example, to meet a desired pressure and flow rate for injection of the auxiliary compressed air into the rotary machine across varying ambient conditions and/or operating points of the rotary machine.

During operation, intake air 121 enters the LPT compressor, where it is compressed. In some embodiments, the intake air is ambient air. In other embodiments, the intake air is compressed air supplied from an electric compressor (e.g., e-booster or electric blower). For example, the embodiment shown in FIG. 1 optionally includes an electric compressor 115 upstream of an inlet of the LPT compressor, adding an additional low cost compression stage to the turbocharger system. For example, the electric compressor may be driven by electrical power received from electric motor 113 along a compressor shaft. The electric motor may be powered by an energy storage 119 device optionally included in the turbocharger system, which may be a rechargeable battery, for example. The electric compressor may be selectively operated to increase an output of the turbocharger system.

The LPT compressor receives the intake air (e.g., as ambient air or compressed air from the electric compressor) and discharges LPT compressed air, which is divided into a heat exchanger flow 123 and a HPT compressor flow 129. In embodiments that include a bank of low pressure turbochargers coupled in parallel, the LPT compressed air from each low pressure turbocharger may be collected in a manifold that combines all of the LPT compressed air into a single stream before it is divided into the heat exchanger flow and the HPT compressor flow. A heat exchanger 118 receives the heat exchanger flow and places the LPT compressed air of the heat exchanger flow into thermal communication with the exhaust gases of the rotary machine, such that at least a portion of the residual heat of the exhaust gases is transferred to the heat exchanger flow. In this way, via the heat exchanger, the hotter exhaust gases of the rotary machine transfer heat to the cooler compressed air from the one or more LPT compressors.

In the depicted embodiment, the heat exchanger is positioned within the exhaust section of the rotary machine. In some embodiments, the rotary machine is part of a simple cycle gas turbine power plant, in which the exhaust section is coupled to an exhaust stack (not shown), and the heat exchanger is coupled upstream of the exhaust stack. In other embodiments, the rotary machine is part of a combined cycle gas turbine power plant, in which the exhaust section is coupled to a heat recovery steam generator (HRSG) configured to supply steam to at least one steam turbine (not shown). For example, the combined cycle power plant may be configured to selectively channel the exhaust gases to either the HRSG or a bypass stack (not shown) depending on operating conditions, and the heat exchanger may be coupled upstream of the bypass stack such that the first turbocharger system is activatable when the combined cycle gas turbine power plant is operated in a simple cycle mode using the bypass stack. In another example, the heat exchanger may be coupled upstream of the HRSG in a series configuration. Thus, the rotary machine and the first turbocharger system may be included in a power generation system. In still other embodiments, the rotary machine is used in any suitable application and/or the heat exchanger is positioned at any suitable location that enables the first turbocharger system to function as described herein.

A water injector 136 may be selectively actuated to inject water received from a water tank (or reservoir) 138 into the heat exchanger flow upstream of the heat exchanger. Together, the water injector and the water tank may comprise a water injection system. The injected water adds mass flow to the heat exchanger flow without increasing compressor work. That is, the water is injected downstream of the LPT compressor and downstream of where the LPT compressed air divides into the HPT compressor flow and the heat exchanger flow, and as such, the additional mass from the injected water is not compressed by any of the compressors of the first turbocharger system. Further, because the injected water does not enter the HPT compressor, the injected water does not enter the auxiliary compressed air injected into the rotary machine. Further still, the injected water may increase an efficiency of heat extraction at the heat exchanger. For example, the injected water may vaporize in the heat exchanger flow, thereby cooling the heat exchanger flow and driving additional heat transfer at the heat exchanger. Additionally, water has a higher heat capacity than air, further increasing an amount of heat transferred to the heat exchanger flow at the heat exchanger. For example, it takes a greater amount of heat to increase a temperature of the water one degree compared with air, enabling more heat to be extracted from the hot exhaust gases before the heat exchanger flow and the exhaust gases reach thermal equilibrium.

A controller 170 is operatively coupled to the water injector and is programmed to control a timing and amount (e.g., flow rate) of the water injected by the water injector, such as based on a desired operating point of the rotary machine and/or the first turbocharger system as well as electronic feedback signals received at the controller, as will be elaborated below. The controller may be comprised of one or more electronic computing devices, including at least one processing device (e.g., a central processing unit, graphics processing unit, microcontroller, and/or any other circuit or processing device capable of executing the functions described herein) and at least one memory chip, including an electronic storage medium for executable programs and calibration values (e.g., non-transitory read-only memory), random access memory, and keep alive memory. Communication between the controller and the at least one sensors and between the controller and the at least one actuator may be obtained through any suitable connection, such as via hardwired or a wireless arrangement. Although the controller is illustrated as a discrete system, the controller may be implemented at least partially by at least one processor embedded within any component of the rotary machine. The above examples are exemplary only, and thus are not intended to limit in any way the definition and/or meaning of the terms controller and processing device.

After flowing through the heat exchanger and becoming heated, a discharged heat exchanger flow 125 is divided by the first turbocharger system into an LPT turbine inlet flow 133 and an HPT turbine inlet flow 131, which drive the LPT turbine and the HPT turbine, respectively. Thus, the LPT turbine inlet flow and the HPT turbine inlet flow are parallel streams from the discharged heat exchanger flow. The LPT turbine receives the LPT turbine inlet flow, and the LPT turbine inlet flow imparts a rotational force on the LPT rotor to drive the LPT compressor. The LPT turbine exhausts the LPT turbine inlet flow to ambient air as LPT exhaust 127. Similarly, the HPT turbine 154 receives the HPT turbine inlet flow, and the HPT turbine inlet flow imparts a rotational force on the HPT rotor, which drives HPT compressor. The HPT turbine exhausts the HPT turbine inlet flow to ambient air as HPT exhaust 155.

As such, the first turbocharger system provides a two-stage waste heat-driven air Brayton cycle injection system.

In some embodiments, one or more of the low pressure turbocharger and the high pressure turbocharger may be an electric turbocharger. For example, FIG. 1 shows the low pressure turbocharger optionally coupled to an electric machine 117, which may be a motor/generator. The electric machine may be selectively operated in an assist mode, where the electric machine draws electrical power from the energy storage device to supplement the waste-heat driven boost driven by the LPT turbine inlet flow on the LPT turbine, or in a regeneration mode, where the electric machine converts kinetic energy of the rotating low pressure turbocharger into electrical energy that may be stored at the energy storage device.

In the exemplary embodiment shown in FIG. 1, a combustor 140 is positioned in parallel with the heat exchanger. The combustor is selectively operated by the controller to add additional heat and mass flow to the discharged heat exchanger flow. Thus, the combustor serves as an auxiliary combustor. The combustor receives fuel from a fuel source 142, which is mixed with air in the combustor and ignited to generate high temperature combustion gases 143. As one example, the fuel source is a refillable fuel tank. As another example, the fuel source is a fuel pipeline. Together, the combustor and the fuel source may be included in a combustion system. The high temperature combustion gases discharged from the combustor join the discharged heat exchanger flow upstream of where the discharged heat exchanger flow divides into the HPT turbine inlet flow and the LPT turbine inlet flow. In the depicted embodiment, the combustor is positioned in a side branched configuration and receives air for combustion from the auxiliary compressed air flow. In other embodiments, the combustor receives air for combustion from an external source, such as a separate compressor, while in the side branched configuration.

Including an external air source does not require additional fuel flow to generate the compressed air that goes to the combustor and does not require additional flow capacity in the HPT compressor to provide both the combustor air and a desired flow of the auxiliary compressed air. In still other embodiments, the combustor is positioned in series with the heat exchanger, as indicated by dashed box 140, such that the discharged heat exchanger flow is received by the combustor and serves as the air source for combustion. By varying a fuel rate (or amount) of the fuel received by the combustor, the controller may vary a level (or amount) of heat increase added to the discharged heat exchanger flow and on to the HPT turbine inlet flow and the LPT turbine inlet flow. Thus, the combustor is operated to provide supplemental heat to drive the turbines of the first turbocharger system, as will be elaborated below.

In the exemplary embodiment shown in FIG. 1, the HPT compressor inlet flow passes through an intercooler 137 positioned in flow communication between an outlet of the LPT compressor and an inlet of the HPT compressor. The intercooler is suitably configured to decrease a temperature of the received HPT compressor inlet flow. As one non-limiting example, the intercooler places the HPT compressor inlet flow into thermal communication with a suitable flow of fluid (not shown) that is at a lower temperature than the HPT compressor inlet flow received by the intercooler. In this way, the intercooler is configured to remove at least a portion of the heat imparted to the HPT compressor inlet flow by the LPT compressor, thereby increasing a density of the HPT compressor inlet flow discharged from the intercooler and received by the HPT compressor. Additionally, cooling the HPT compressor inlet flow via the intercooler reduces a discharge temperature of the HPT compressor, allowing for less costly compressor wheel materials to be used (e.g., aluminum). In alternative embodiments, the first turbocharger system does not include the intercooler. The HPT compressor receives the HPT compressor inlet flow, further compresses the HPT compressor inlet flow, and discharges the compressed HPT compressor inlet flow as the auxiliary compressed air 153.

The controller may operate the combustor, the water injector, or both to increase a mass flow of the auxiliary compressed air provided to the rotary machine based on electronic feedback signals received from one or more sensors and according to one or more routines. For example, the controller is operatively coupled to a plurality of sensors 16, examples of which are described herein, and a plurality of actuators 81, examples of which are also described herein. For example, the plurality of sensors may include various temperature, pressure, humidity, mass flow, and speed sensors coupled throughout the turbocharger system, such as a pressure and/or mass flow sensor 160 configured to measure a pressure and/or mass flow of the auxiliary compressed air; a humidity sensor 139 configured to measure a humidity of the discharged heat exchanger flow; a temperature sensor 141 configured to measure a temperature of the HPT turbine inlet flow; a water level sensor 135 configured to measure a level (or amount) of water in the water tank; and a fuel level sensor 145 configured to measure a level (or amount) of fuel in the fuel source. As one example, the humidity sensor may be configured to measure both a temperature and a moisture (e.g., water vapor) content of the discharged heat exchanger flow to determine a relative humidity of the flow (e.g., a ratio of the measured moisture in the flow to the maximum possible amount of moisture at the measured temperature, which may be expressed as a percentage). The plurality of actuators may include, for example, the water injector, the combustor, the electric motor of the optionally included electric compressor, and the electric machine (when one or more of the low pressure turbocharger and high pressure turbochargers is an electric turbocharger). The controller may receive input data from the various sensors, process the input data, and trigger the actuators (e.g., the combustor and/or the water injector) in response to the processed input data based on instruction or code programmed in a memory of the controller corresponding to one or more routines, examples of which are described with respect to FIGS. 4-7.

As an example, the controller may activate the water injector at a determined duty cycle based on operating conditions, including ambient conditions and conditions of the turbocharger system and the rotary machine, and a desired auxiliary compressed air mass flow rate and/or pressure. A maximum mass flow increase may be achieved via water injection when the discharged heat exchanger flow becomes saturated with water vapor (e.g., 100% humidity, as measured by the humidity sensor).

As another example, the controller may operate the combustor with a fuel rate determined based on the operating conditions and the desired auxiliary compressed air mass flow rate. As a further example, the controller may coordinate control of the water injector and the combustor based on the operating conditions and the desired auxiliary compressed air mass flow rate. For example, operating the combustor to add the high temperature combustion gases to the discharged heat exchanger flow increases a temperature of both the LPT turbine inlet flow and the HPT turbine inlet flow, thereby increasing an amount of heat energy input into the turbines. However, extreme heat may degrade turbines. Thus, an amount of the high temperature combustion gases that can be added to the discharged heat exchanger flow is limited by a pre-turbine temperature, and the controller may adjust the fuel rate based on the temperature of the HPT inlet flow (e.g., as measured by the temperature sensor), for example. Further, as mentioned above, water vapor increases a heat capacity of a gas stream. Therefore, water injection may not only increase the mass flow through the turbines of the turbocharger system, but may enable additional fuel to be combusted at the combustor compared to when water injection is not performed. As still another example, the controller may select a portion of a desired output increase to achieve from the water injection system or the combustor based on a current relative cost of fuel and water in order to minimize overall operating costs of the turbocharger system.

In other embodiments, instead of including both the water injector and the combustor, the turbocharger system may include only the water injector or only the combustor. For example, FIG. 2 shows a schematic depiction of a second exemplary turbocharger system 200 that includes the water injection system (including the water injector 136, the water tank 138, and the water level sensor 135) and not the auxiliary combustor 140 (and the fuel source 142 and the fuel level sensor 145), and FIG. 3 shows a schematic depiction of a third exemplary turbocharger system 300 that includes the auxiliary combustor 140 (and the fuel source 142 and the fuel level sensor 145) and not the water injection system. Except as described above, the second and third turbocharger systems are substantially the same as the first turbocharger system 100 of FIG. 1 and are configured to inject air into the rotary machine 110, and as such, like components are numbered the same and will not be reintroduced. Further, in some examples, the second turbocharger system may not include the temperature sensor 141, as shown in FIG. 2, and the third turbocharger system may not include the humidity sensor 139, as shown in FIG. 3.

Next, FIGS. 4-7 show example methods for increasing an output of a waste heat-driven air Brayton cycle turbocharger system. For example, the waste heat-driven air Brayton cycle turbocharger system may be the first turbocharger system 100 shown in FIG. 1, the second turbocharger system 200 shown in FIG. 2, or the third turbocharger system 300 shown in FIG. 3. Each of the first, second, and third turbocharger systems are configured to inject auxiliary compressed air into a combustor of a rotary machine (e.g., rotary machine 110 of FIGS. 1-3) and are driven by residual heat from exhaust gases of the rotary machine. In each example, the output of the turbocharger system may be increased by actuating a combustor of the turbocharger system (e.g., combustor 140 of FIGS. 1 and 3), a water injector of the turbocharger system (e.g., water injector 136 of FIGS. 1 and 2), or both.

Figure 4:
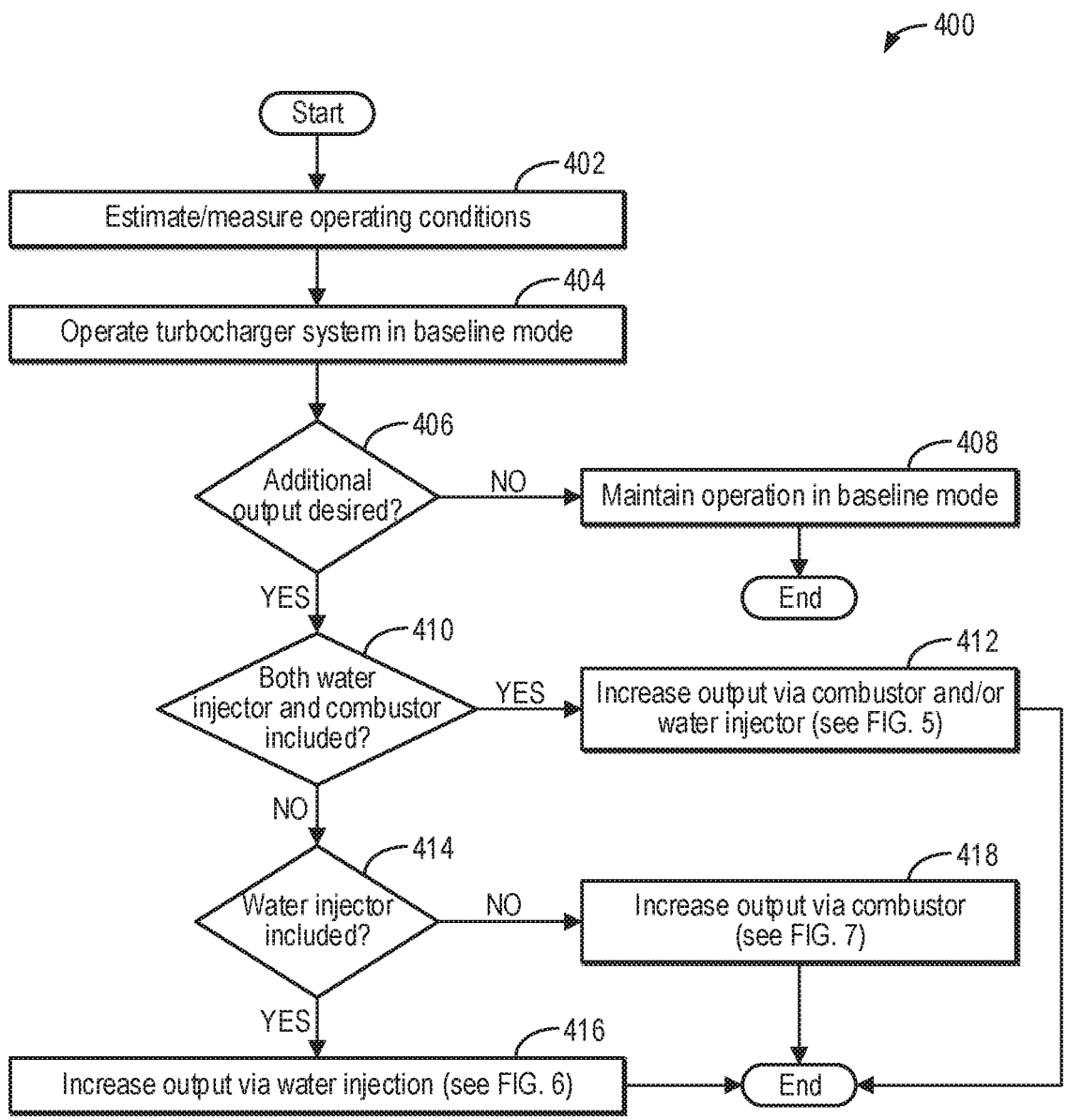
FIG. 4 is a flow chart showing a high-level method for increasing an output of a turbocharger system.

Turning first to FIG. 4, a high level example method 400 for assessing operating conditions of the turbocharger system to determine if additional output of the turbocharger system and/or rotary machine is desired and then determining which actuators are available to increase output is shown. Instructions for carrying out method 400 and the rest of the methods included herein may be executed by a controller (e.g., controller 170 of FIGS. 1-3) based on instructions stored on a memory of the controller and in conjunction with signals received from sensors of the system, such as the sensors described above with reference to FIGS. 1-3 (e.g., sensors 16 of FIGS. 1-3). The controller may employ actuators of the turbocharger system (e.g., the combustor and/or the water injector) to adjust turbocharger system operation according to the methods described below.

At 402, method 400 includes estimating and/or measuring operating conditions. The operating conditions may include ambient conditions, such as ambient temperature and ambient pressure; operating conditions of the rotary machine, such as a mass flow rate of the rotary machine, a desired pressure and/or flow rate of auxiliary compressed air to inject at the rotary machine, and a temperature of exhaust gases discharged by the rotary machine; and operating conditions of the turbocharger system, such as a pressure and/or flow rate of the auxiliary compressed air provided by the turbocharger system and the operating conditions of the high pressure turbocharger and the low pressure turbocharger, including a pressure ratio across a compressor of the high pressure turbocharger (e.g., HPT compressor 152 of FIGS. 1-3), a mass flow through the compressor of the high pressure turbocharger, a rotor speed of the high pressure turbocharger, a pressure ratio across a compressor of the low pressure turbocharger (e.g., LPT compressor 130 of FIGS. 1-3), a mass flow through the compressor of the low pressure turbocharger, a rotor speed of the low pressure turbocharger, and temperatures and pressures at the inlet and outlet of the compressor and turbine of at least one of the high pressure turbocharger and the low pressure turbocharger.

The desired flow rate of the auxiliary compressed air to inject at the rotary machine may be determined be based on an operating limit of a compressor of the rotary machine (e.g., a maximum allowable injection rate), a desired increase in output and/or reduction in a fuel rate (e.g., efficiency increase) of the rotary machine, and a maximum flow rate the turbocharger system can deliver (and a cost to deliver it if the water injector and/or the combustor of the turbocharger system are used). A relationship between the flow rate of the auxiliary compressed air injected at the rotary machine and the resulting power increase and/or fuel rate decrease of the rotary machine is a characteristic of the rotary machine and may vary with load and ambient conditions. The injection pressure is determined by a compressor discharge pressure of the rotary machine and the required additional pressure to overcome a pressure drop in piping of the combustor of the rotary machine and drive the injection flow into the combustor at the desired flow rate. Therefore, as one example, the controller may input the desired increase in output and/or reduction in the fuel rate of the rotary machine, or to minimize the overall cost per unit power output of the rotary machine, by inputting the compressor discharge pressure of the rotary machine, the load of the rotary machine, and the ambient conditions into one or more look-up tables, algorithms, or maps, which may output the desired flow rate and pressure of the auxiliary air. Further, the desired flow rate and pressure of the auxiliary compressed air may be bounded by the maximum allowable injection rate (of the rotary machine) and the maximum deliverable flow rate (of the turbocharger system). Further still, in some examples, the controller may additionally or alternatively optimize the desired flow rate and pressure of the auxiliary compressed air to minimize the overall cost per unit power output of the rotary machine.

At 404, method 400 includes operating the turbocharger system in a baseline (e.g., passive) mode. Operating the turbocharger system in the baseline mode includes driving the turbocharger system by extracting waste heat from the exhaust gases discharged by the rotary machine at the heat exchanger without adding additional energy or mass flow to the turbocharger system (e.g., via the combustor and/or the water injector). While operating the turbocharger system in the baseline mode, the turbocharger system may operate at an equilibrium point based on a flow rate and a temperature of the exhaust gases and a flow rate and pressure of the auxiliary compressed air generated by the turbocharger system, which is further influenced by ambient conditions (e.g., ambient temperature and pressure). Thus, the baseline mode is not actively controlled to increase or decrease the pressure and/or flow rate of the auxiliary compressed air generated by the turbocharger system and injected at the rotary machine, and the turbocharger system output is at a baseline level.

At 406, method 400 includes determining if additional output is desired. The additional output may be additional turbocharger system output (e.g., a higher pressure and/or flow rate of the auxiliary compressed air) and/or additional power output of the rotary machine. Additional turbocharger system output may be desired when the turbocharger system is unable to provide the desired pressure and/or flow rate of the auxiliary compressed air to the rotary machine while operating in the baseline mode, for example. Further, when the turbocharger system is unable to provide the desired pressure and/or flow rate of the auxiliary compressed air to the rotary machine, the rotary machine may be unable to produce the desired power output. In one example, the desired output of the rotary machine, and consequently the turbocharger system, may be based on the load being driven by the rotary machine (e.g., as the demanded load increases, the desired power output may increase). If additional output is not desired, method 400 proceeds to 408 and includes maintaining operation in the baseline mode. As such, the turbocharger system will be driven by extracting waste heat from the exhaust gases of the rotary machine and will not be actively controlled. Additional heat will not be provided via the combustor, and additional mass flow will not be provided via the water injector. Method 400 may then end.

If additional turbocharger system output is desired, such as when the turbocharger system is unable to extract sufficient waste heat from the exhaust gas for generating the desired pressure and/or flow rate of the auxiliary compressed air to produce the desired power output, method 400 proceeds to 410 and includes determining if both the water injector and the combustor are included in the turbocharger system. In one example, the controller may automatically determine whether both the water injection system and combustion system are included in the turbocharger system based on known turbocharger system components and/or preprogrammed instructions stored into the memory of the controller. In some examples, the method may proceed directly from 406 to either 412, 418, or 416 (as described further below) based on the preprogrammed instructions and/or known system components.

If both the water injector and the combustor are included in the turbocharger system, such as in the first exemplary turbocharger system 100 shown in FIG. 1, method 400 proceeds to 412 and includes increasing the output via the combustor and/or the water injector, as will be described below with respect to FIG. 5. For example, the controller may make a determination of whether to increase the power output of the turbocharger system by actuating the combustor (of the turbocharger system) to add additional heat to a gas stream that flows to a HPT turbine and the LPT turbine of the turbocharger system, thereby increasing an amount of energy input to the HPT turbine and the LPT turbine and increasing an output of the HPT compressor and the LPT compressor accordingly, or by actuating the water injector to add additional mass flow and waste heat extraction capacity to the gas stream. In a further example, the controller may actuate the water injector while operating the combustor in order to increase an operating range of the combustor, as will be elaborated below. Following 412, method 400 may end.

Returning to 410, if the water injector and the combustor are not both included in the turbocharger system, method 400 proceeds to 414 and includes determining if the water injector is included in the turbocharger system, such as in the second exemplary turbocharger system 200 shown in FIG. 2. If the water injector is included in the turbocharger system (and the combustor is not included), method 400 proceeds to 416 and includes increasing the output via water injection, as will be described below with respect to FIG. 6. For example, the controller may actuate the water injector at a determined duty cycle to add the additional mass flow and waste heat extraction capacity to the gas stream for generating the desired pressure and/or flow rate of auxiliary compressed air. Method 400 may then end.

Returning to 414, if the water injector is not included in the turbocharger system, it may be inferred that the combustor is included in the turbocharger system, such as in the third exemplary turbocharger system 300 shown in FIG. 3, and method 400 proceeds to 418 and includes increasing the output via the combustor, as will be described below with respect to FIG. 7. For example, the controller may provide fuel to the combustor at a desired fueling rate to add the additional heat to the gas stream for generating the desired pressure and/or flow rate of auxiliary compressed air. Method 400 may then end.

Figure 5:
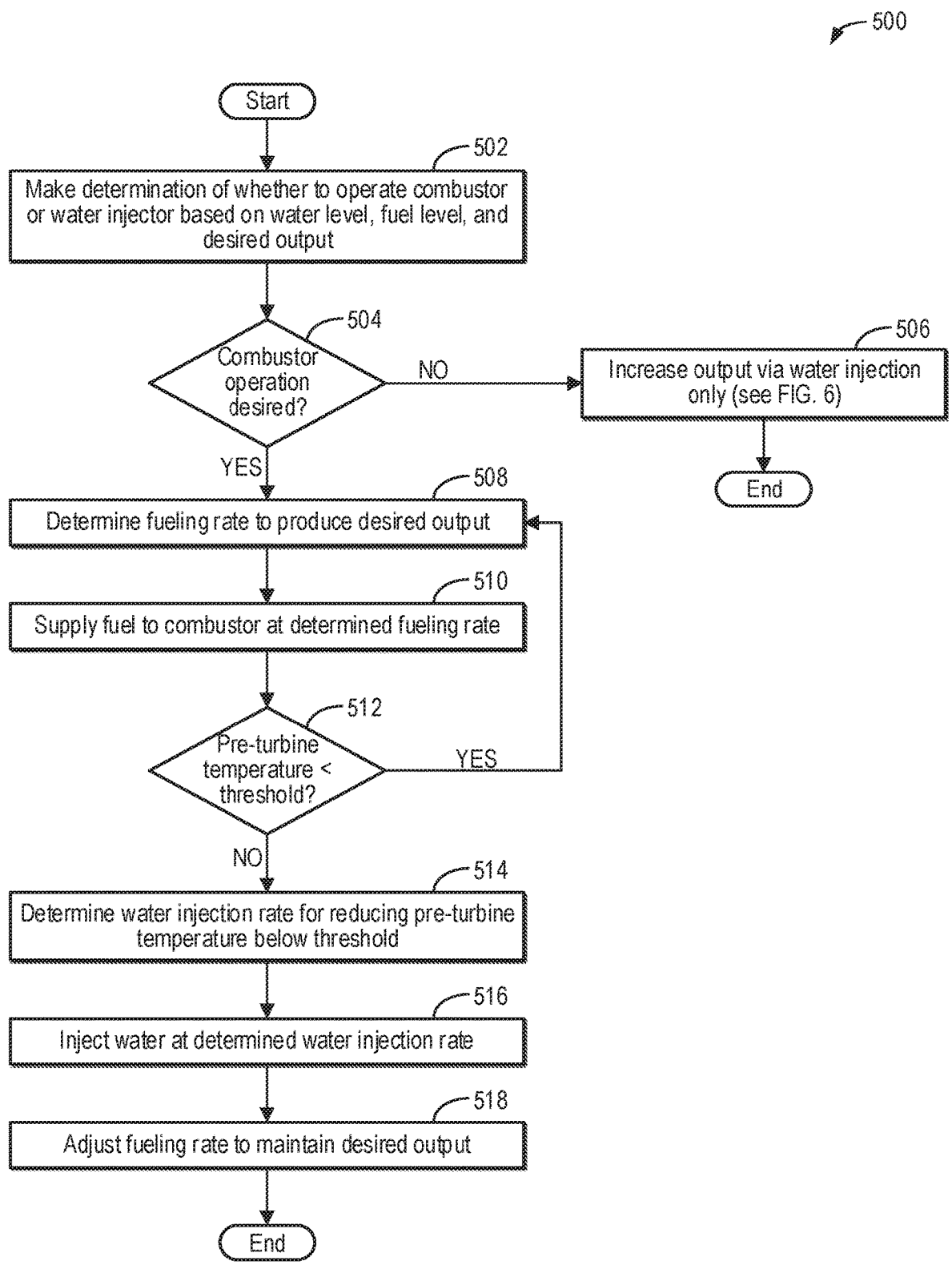
FIG. 5 is a flow chart showing a method for increasing an output of a turbocharger system via water injection by a water injector and/or combustion at an auxiliary combustor.

Continuing to FIG. 5, an example method 500 for actively adjusting an operating point of the turbocharger system via the combustor of the turbocharger system, the water injector of the turbocharger system, or both is shown. As an example, the controller may perform method 500 as a part of method 400 of FIG. 4 (e.g., at 412). In particular, the controller may perform method 500 when the turbocharger system includes both the combustor and the water injector, such as the first turbocharger system 100 shown in FIG. 1.

At 502, method 500 includes making a determination of whether to operate the combustor or the water injector based on a water level in a water tank (e.g., as measured by water level sensor 135 of FIG. 1), a fuel level in a fuel source (e.g., as measured by fuel level sensor 145 of FIG. 1), and the desired output of the turbocharger system (e.g., the desired pressure and/or flow rate of the auxiliary compressed air, as determined above at 402 of FIG. 4). For example, the combustor may provide a greater power increase compared with the water injector, but combusting fuel at the combustor increases exhaust gas emissions whereas injecting water does not. Therefore, if the desired turbocharger output can be met by injecting water, the controller may determine that the water injector, and not the combustor, should be used in order to decrease emissions. As another example, the combustor may be preferred when the fuel level in the fuel source is relatively high and the water level in the fuel source is relatively low. Conversely, the water injector may be preferred when the water level in the fuel source is relatively high and the fuel level in the fuel source is relatively low. For example, the controller may determine whether to use the water injector or the combustor based on the availability of water versus fuel. As another example, additionally or alternatively, the controller may determine whether to use the water injector or the combustor based on a relative cost of water and fuel, such as by selecting the combustor when the cost of operating the combustor is lower and selecting the water injector when the cost of operating the water injector is lower.

As one example, when the water level in water tank is less than a threshold water level and the fuel level in the fuel source is greater than a threshold fuel level, the controller may select the combustor for increasing the output of the turbocharger system and/or the rotary machine. The threshold water level may be a first pre-calibrated value stored in the memory of the controller below which increased output cannot be met or sustained via water injection. For example, the water tank may be nearing empty when the water level is less than the threshold water level. Similarly, the threshold fuel level may be a second pre-calibrated value store in the memory of the controller, which may be different from or the same as the first pre-calibrated value, below which increased output cannot be met or sustained via the combustor. As another example, when the water level is above the threshold water level and the fuel level is above the threshold fuel level, the controller may select the water injector for increasing the output in order to decrease emissions. Then, in response to the water level dropping below the threshold, the controller may stop actuating the water injector and switch to actuating the combustor for increasing the output.

At 504, method 500 includes determining if combustor operation is desired (e.g., as determined at 502). If combustor operation is not desired, then water injector operation is desired, and method 500 proceeds to 506 and includes increasing the output of the turbocharger system via water injection only, as will be described below with respect to FIG. 6. Thus, even though the turbocharger system also includes the combustor, the combustor will not be used, such as due to fuel scarcity or to decrease emissions. Method 500 may then end.

If combustor operation is desired, method 500 proceeds to 508 and includes determining a fueling rate to produce the desired turbocharger system output. As one example, the controller may determine a difference between the current output of the turbocharger system and/or the rotary machine (e.g., achieved while operating in the baseline mode described above at 404) and the increased desired output and then determine a fueling rate that is expected to produce enough heat energy to the gas stream to compensate for the difference. For example, the controller may input the difference into one or more look-up tables, algorithms, or functions, which may output the corresponding fueling rate that is expected to bring the output of the turbocharger system and/or the rotary machine to the desired output. As another example, the controller may make a logical determination (e.g., regarding the fueling rate) based on logic rules that are a function of the operating conditions, including the ambient temperature, the temperature of the discharged heat exchanger flow, and the measured humidity.

At 510, method 500 includes supplying fuel to the combustor at the determined fueling rate (e.g., as determined at 508). For example, fuel from the fuel source may be injected into the combustor via a fuel injector of the combustor. The controller may determine a control signal to send to the fuel injector, such as a pulse width and/or duty cycle of the signal, that will result in the determined fueling rate. Once injected, the fuel may mix with air and be ignited (e.g., by a spark igniter) to produce high temperature combustion gases. The high temperature combustion gases may then flow to the LPT turbine and the HPT turbine to drive the turbines, as described above with respect to FIG. 1.

At 512, method 500 includes determining if a pre-turbine temperature is less than a threshold temperature. The threshold temperature may be a pre-calibrated temperature stored in the memory of the controller at or above which degradation of the HPT turbine and/or the LPT turbine may occur due to excessive heat. The pre-turbine temperature may be measured by a temperature sensor positioned at an inlet of the HPT turbine, for example, such as temperature sensor 141 shown in FIG. 1. Alternatively, the pre-turbine temperature may be measured by a temperature sensor positioned at an inlet of the LPT turbine. As another alternative example, the pre-turbine temperature may be measured by a temperature sensor positioned downstream of the combustor and upstream of where a HPT turbine inlet flow (e.g., HPT turbine inlet flow 131 shown in FIG. 1) is divided from a LPT turbine inlet flow (e.g., LPT turbine inlet flow 133 shown in FIG. 1).

If the pre-turbine temperature is less than the threshold temperature, method 500 may return to 508 to continue determining the fueling rate to produce the desired turbocharger system output. For example, the controller may automatically and continuously (e.g., in real-time as operating conditions change, as determined from received signals for various sensors of the system) determine the fueling rate that will produce the desired turbocharger system output and update the fueling rate of fuel supplied to the combustor accordingly. As another example, the desired output may change. For example, in response to a decrease in the desired output, the fueling rate may be decreased to decrease the amount of heat energy added to the gas stream. The fueling rate may be further decreased to further decrease the turbocharger system output and/or the rotary machine power output down to a fueling rate of zero, where no fuel is provided to the combustor, the combustor is deactivated, and the turbocharger system is operated in the baseline mode (e.g., as described above at 406). Conversely, in response to an increase in the desired output, the fueling rate may be increased to increase the amount of heat energy added to the gas stream. Additionally, the controller may automatically and continuously reassess the pre-turbine temperature as the operating conditions and the fueling rate change to maintain the pre-turbine temperature below the threshold temperature.

If the pre-turbine temperature is not less than the threshold temperature, method 500 proceeds to 514 and includes determining a water injection rate for reducing the pre-turbine temperature below the threshold temperature. As one example, the controller may determine the water injection rate for reducing the pre-turbine temperature below the threshold temperature via a look-up table, algorithm, or function stored in the memory of the controller that takes into account a difference between the current pre-turbine temperature and the threshold turbine temperature as well as a heat capacity of water. The controller may determine a control signal to send to the water injector, such as a pulse width and/or duty cycle of the signal, that will result in the determined water injection rate. As another example, the water injection rate may be increased iteratively in a stepwise fashion. For example, the controller may increase the water injection rate by a pre-determined amount, measure the pre-turbine temperature, and determine if the pre-turbine temperature remains at or above the threshold temperature. In response to the pre-turbine temperature remaining at or above the threshold temperature, the controller may again increase the water injection rate by the pre-determined amount and repeat the pre-turbine temperature assessment until the pre-turbine temperature is less than the threshold temperature.

At 516, method 500 includes injecting water at the determined water injection rate. For example, water from the water tank may be injected into the compressed gas stream from the one or more LPT compressors before entering the heat exchanger. The injected water may vaporize at the heat exchanger and increase a heat capacity of the discharged heat exchanger flow such that a temperature of the HPT turbine inlet flow and the LPT turbine inlet flow is decreased.

At 518, method 500 may include adjusting the fueling rate to maintain the desired output. As one example, the increased heat capacity of the discharged heat exchanger flow may enable additional fuel to be combusted at the combustor without the pre-turbine temperature reaching the threshold. As another example, the increased mass flow due to the injected water may also increase the output of the turbocharger system, and thus, the power output of the rotary machine. Therefore, if additional output is desired, the controller may increase the fueling rate, and if reduced output is desired, the controller may decrease the fueling rate. In still other examples, if additional output is desired and the water injection rate is being set such that the system is operating with the pre-turbine temperature at the threshold temperature, than either the water injection rate can be increased (which would reduce pre-turbine temperature and increase the mass flow through the turbines), or the water injection rate and the fuel rate can be increased in such a proportion so as to maintain the pre-turbine temperature below the threshold temperature (e.g., the added water injection rate compensates for the added heat from the higher fuel rate). The method may then end.

Figure 6:
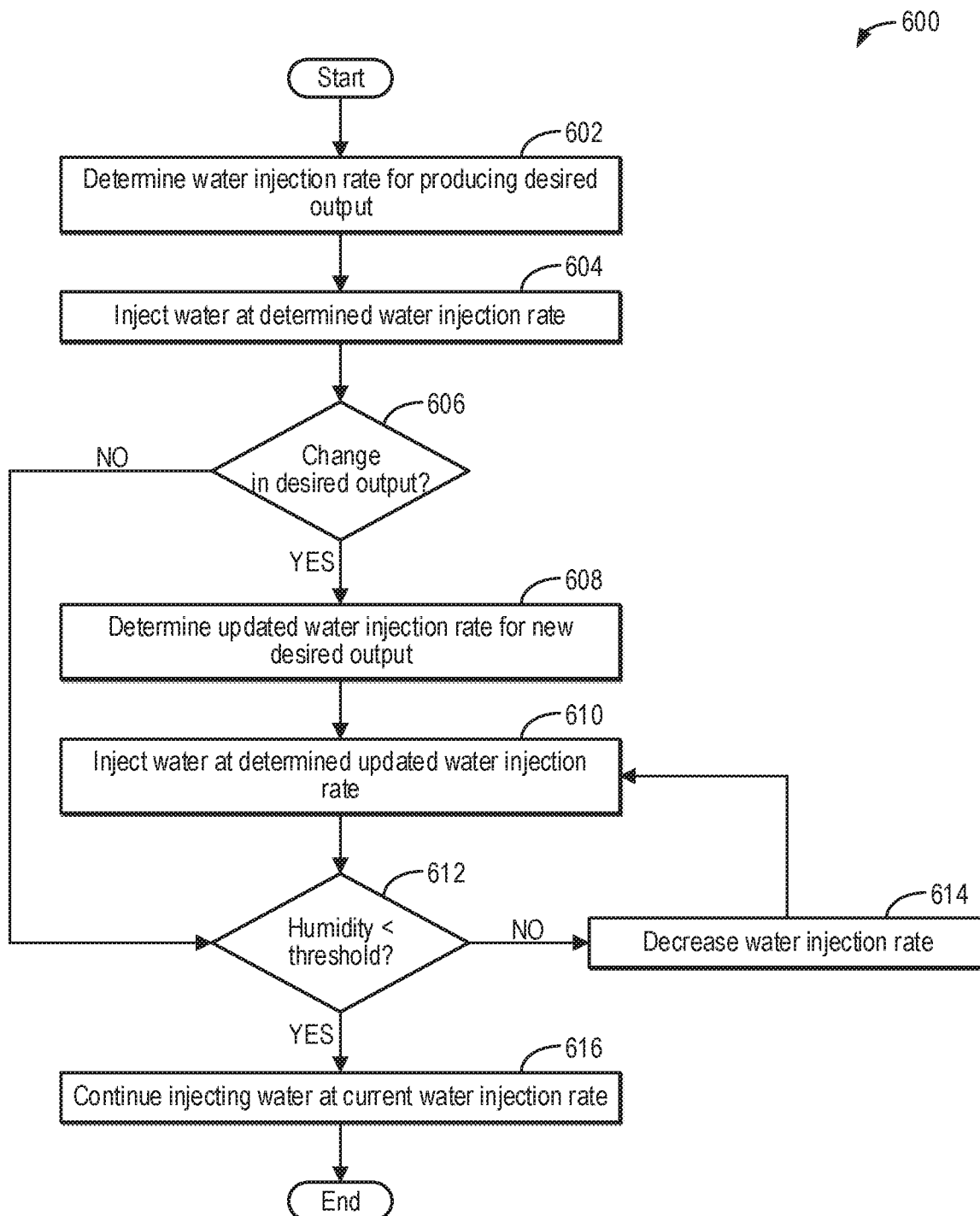
FIG. 6 is a flow chart showing a method for increasing an output of a turbocharger system via water injection by a water injector.

Continuing to FIG. 6, an example method 600 for actively adjusting an output of the turbocharger system via the water injector is shown. As an example, the controller may perform method 600 as a part of method 400 of FIG. 4 (e.g., at 416) or method 500 of FIG. 5 (e.g., at 506). In particular, the controller may perform method 600 when the turbocharger system includes only the water injector, such as the second turbocharger system 200 shown in FIG. 2, or when the turbocharger system includes both the water injector and the combustor and the combustor is not used.

At 602, method 600 includes determining a water injection rate for producing the desired output. As one example, the controller may determine a difference between the current output of the turbocharger system and/or the rotary machine (e.g., achieved while operating in the baseline mode described above at 404) and the increased desired output and then determine a water injection rate that is expected to produce an added mass flow and heat extraction capacity to the gas stream to compensate for the difference. For example, the controller may input the difference into one or more look-up tables, algorithms, or functions, which may output the corresponding water injection rate that is expected to bring the output of the turbocharger system and/or the rotary machine to the desired output. As another example, the controller may make a logical determination (e.g., regarding the water injection rate) based on logic rules that are a function of the operating conditions, including the ambient temperature, the temperature of the exhaust gases of the rotary machine, the mass flow of the compressed air flowing through the heat exchanger, and the measured humidity. The controller may determine a control signal to send to the water injector, such as a pulse width and/or duty cycle of the signal, that will result in the determined water injection rate. As a further example, the water injection rate may be increased iteratively in a stepwise fashion. For example, the controller may increase the water injection rate by a pre-determined amount and determine if the output remains below the desired output. In response to the output remaining below the desired output, the controller may again increase the water injection rate by the pre-determined amount until the desired output is achieved.

At 604, method 600 includes injecting water at the determined water injection rate. For example, water from the water tank may be injected into the compressed gas stream from the LPT compressor before entering the heat exchanger. The injected water may vaporize at the heat exchanger and increase a heat capacity of the discharged heat exchanger flow such heat from the exhaust gases of the rotary machine is more efficiently extracted. Further, the injected water adds mass to the discharged heat exchanger flow, which increases the mass flow through the HPT turbine and the LPT turbine to increase the pressure and/or flow rate of the auxiliary compressed air provided to the rotary machine, and thus, increase the power output of the rotary machine.

At 606, method 600 includes determining if there is a change in the desired output. For example, the desired output may further increase or may decrease. In response to a decrease in the desired output, the water injection rate may be decreased to decrease the additional mass and heat capacity added to the gas stream. The water injection rate may be further decreased to further decrease the turbocharger system output and/or the rotary machine power output down to a water injection rate of zero, where no the water injector is deactivated and the turbocharger system is operated in the baseline mode (e.g., as described above at 406). Conversely, in response to an increase in the desired output, the water injection rate may be increased to increase the additional mass and heat capacity added to the gas stream. Additionally, the controller may automatically and continuously reassess the operating conditions and update the water injection rate in order to maintain the desired output as operating conditions change.

If there is not a change in the desired output of the turbocharger system, method 600 proceeds to 612 and includes determining if a humidity of the discharged heat exchanger flow is greater than a threshold humidity, as will be described below. If there is a change in the desired output of the turbocharger system, method 600 proceeds to 608 and includes determining an updated water injection rate for the new desired output. The updated water injection rate may be determined as described above at 602, for example.

At 610, method 600 includes injecting water at the determined updated water injection rate. As such, the added mass and heat capacity may be increased or decreased to provide more output or less output, respectively, depending on demand. In particular, the variability of the water injection rate enables the turbocharger system to be variably operated at to achieve desired operating points that are above the baseline level.

At 612, it is determined if the humidity of the discharged heat exchanger flow is greater than the threshold humidity. For example, the humidity may be a relative humidity value measured by a humidity sensor positioned near an outlet of the heat exchanger (e.g., humidity sensor 139 of FIGS. 1 and 2). The threshold humidity may be a pre-calibrated relative humidity value stored in a memory of the controller above which the discharged heat exchanger flow is approaching saturation with water vapor, such as a value in a range from 90-99%. As one non-limiting example, the threshold humidity is 95%. In an alternative example, a humidity on the inlet side of the heat exchanger may be compared to the threshold humidity, such as when it is desired to avoid liquid water entering the heat exchanger (e.g., due to stress, fouling, or other degradation).

If the humidity is not less than the threshold humidity, method 600 proceeds to 614 and includes decreasing the water injection rate. As one example, the controller may determine an updated, decreased water injection rate based on a difference between the measured humidity and the threshold humidity. For example, the controller may input the difference into one or more look-up tables, algorithms, or functions, which may output the corresponding decreased water injection rate that is expected to bring the humidity below the threshold humidity. As another example, the controller may make a logical determination (e.g., regarding the updated, decreased water injection rate) based on logic rules that are a function of the operating conditions, including the ambient temperature, the temperature of the discharged heat exchanger flow, and the measured humidity. The method may then return to 610 to inject water at the decreased water injection rate, such as by adjusting the duty cycle of the water injector accordingly, and proceed to 612 to confirm that the humidity is less than the threshold humidity.

As another example, the water injection rate may be decreased iteratively in a stepwise fashion. For example, the controller may decrease the water injection rate by a pre-determined amount, measure the humidity of the discharged heat exchanger flow, and determine if the humidity remains above the threshold humidity. In response to the humidity remaining above the threshold humidity, the controller may again decrease the water injection rate by the pre-determined amount and repeat the humidity assessment until the humidity is less than the threshold humidity. In some examples, the turbocharger system may be unable to meet the desired turbocharger system output with the decreased water injection rate. However, maintaining the humidity below the threshold humidity may help prevent liquid water from forming in the turbocharger system, which may degrade turbocharger system operation and/or degrade turbocharger system components.

If, at 612, the humidity is less than the threshold humidity, method 600 proceeds to 616 and includes continuing injecting water at the current water injection rate. As described above, the controller may continue to update the water injection rate as operating conditions and/or the desired output changes, but the water injection rate may not be adjusted to decrease the humidity while the humidity is less than the threshold humidity. Method 600 may then end.

Figure 7:
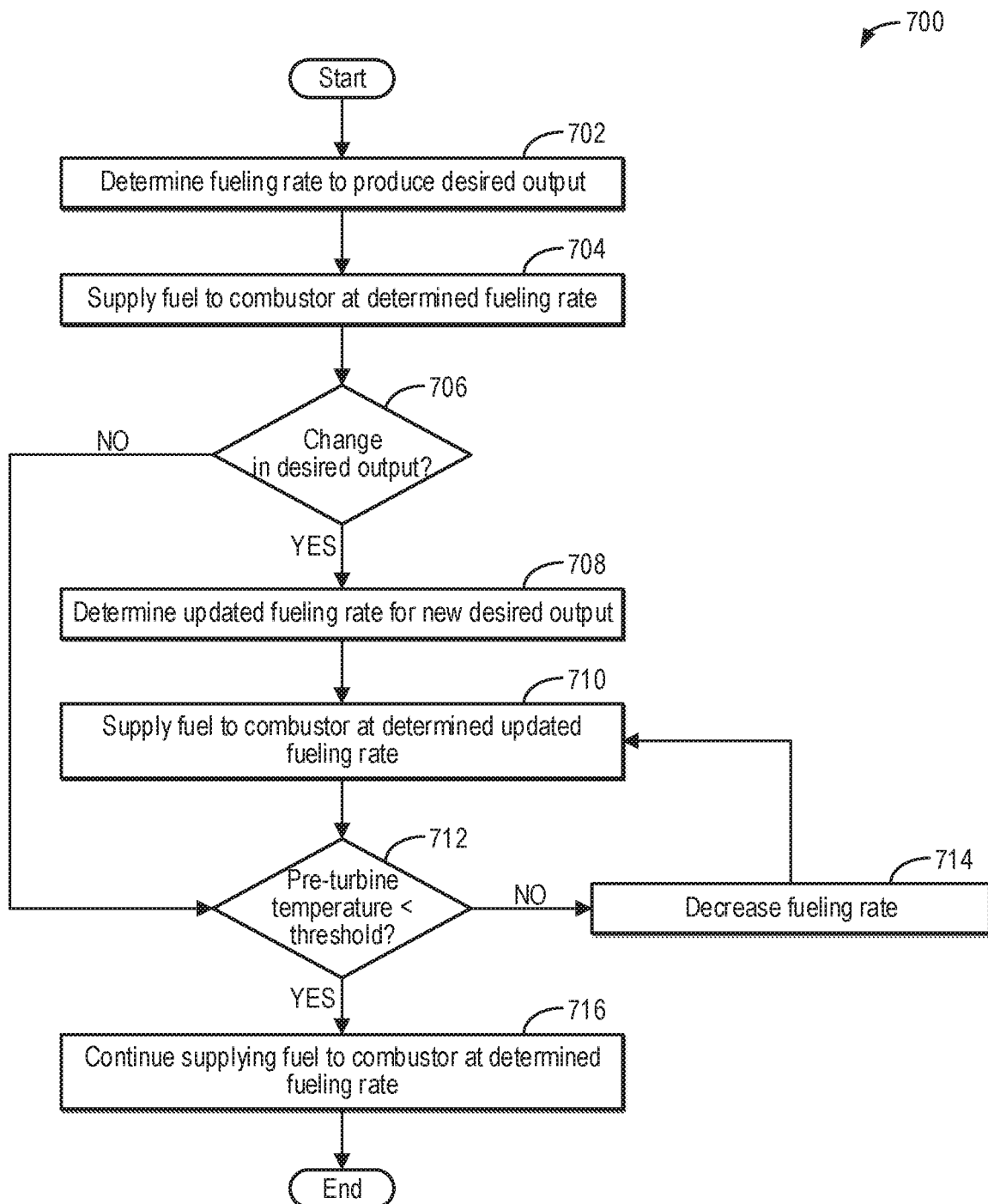
FIG. 7 is a flow chart showing a method for increasing an output of a turbocharger system via combustion at an auxiliary combustor.

Next, FIG. 7 shows an example method 700 for actively adjusting an output of the turbocharger system via the combustor. As an example, the controller may perform method 700 as a part of method 400 of FIG. 4 (e.g., at 418). In particular, the controller may perform method 700 when the turbocharger system includes only the combustor, such as the third turbocharger system 300 shown in FIG. 3.

At 702, method 700 includes determining a fueling rate for producing the desired output of the turbocharger system. As one example, the controller may determine a difference between the current output of the turbocharger system and/or the rotary machine (e.g., achieved while operating in the baseline mode described above at 404) and the increased desired output and then determine a fueling rate that is expected to produce enough heat energy to the gas stream to compensate for the difference. For example, the controller may input the difference into one or more look-up tables, algorithms, or functions, which may output the corresponding fueling rate that is expected to bring the output of the turbocharger system and/or the rotary machine to the desired output. As another example, the controller may make a logical determination (e.g., regarding the fueling rate) based on logic rules that are a function of the operating conditions, including the ambient temperature, the temperature of the discharged heat exchanger flow, and the measured humidity.

At 704, method 700 includes supplying fuel to the combustor at the determined fueling rate. As described above at 510 of FIG. 5, fuel from the fuel source may be injected into the combustor via a fuel injector of the combustor, where it may mix with air and be ignited to produce high temperature combustion gases. The high temperature combustion gases may then flow to the LPT turbine and the HPT turbine to drive the turbines, as described above with respect to FIG. 1.

At 706, method 700 includes determining if there is a change in the desired output of the turbocharger system. For example, the desired output may further increase or may decrease. In response to a decrease in the desired output, the fueling rate may be decreased to decrease the additional heat energy added to the gas stream. The fueling rate may be further decreased to further decrease the turbocharger system output and/or the rotary machine power output down to a fueling rate of zero, where no fuel is injected into the combustor, the combustor is deactivated, and the turbocharger system is operated in the baseline mode (e.g., as described above at 406). Conversely, in response to an increase in the desired output, the fueling rate may be increased to increase the additional heat energy added to the gas stream. Additionally, the controller may automatically and continuously reassess the operating conditions and update the fueling rate in order to maintain the desired output as operating conditions change.

If there is not a change in the desired output of the turbocharger system, method 700 proceeds to 712 and includes determining if the pre-turbine temperature is less than the threshold temperature, as will be described below. If there is a change in the desired output of the turbocharger system, method 700 proceeds to 708 and includes determining an updated fueling rate for the new desired output. The fueling rate may be determined as described above at 702, for example.

At 710, method 700 includes fuel to the combustor at the determined updated fueling rate. As such, the added heat energy may be increased or decreased to provide more output or less output, respectively, depending on demand. In particular, the variability of the fueling rate enables the turbocharger system to be variably operated at to achieve desired operating points that are above the baseline level.

At 712, it is determined if the pre-turbine temperature is less than the threshold temperature, as described above at 512 of FIG. 5. If the pre-turbine temperature is not less than the threshold temperature, method 700 proceeds to 714 and includes decreasing the fueling rate. As one example, the controller may determine an updated, decreased fueling rate based on a difference between the measured the pre-turbine temperature and the threshold temperature. For example, the controller may input the difference into one or more look-up tables, algorithms, or functions, which may output the corresponding decreased fueling rate that is expected to bring the pre-turbine temperature below the threshold temperature. As another example, the controller may make a logical determination (e.g., regarding the updated, decreased fueling rate) based on logic rules that are a function of the operating conditions, including the ambient temperature and the pre-turbine temperature. The method may then return to 710 to supply fuel to the combustor at the decreased fueling rate and proceed to 712 to confirm that the pre-turbine temperature is less than the threshold temperature.

As another example, the fueling rate may be decreased iteratively in a stepwise fashion. For example, the controller may decrease the fueling rate by a pre-determined amount, measure the pre-turbine temperature, and determine if the pre-turbine temperature remains above the threshold temperature. In response to the pre-turbine temperature remaining above the threshold temperature, the controller may again decrease the fueling rate by the pre-determined amount and repeat the pre-turbine temperature assessment until the pre-turbine temperature is less than the threshold temperature. In some examples, the turbocharger system may be unable to meet the desired output with the decreased fueling rate. However, maintaining the pre-turbine temperature below the threshold temperature may help avoid degradation of the HPT turbine and/or the LPT turbine.

If, at 712, the pre-turbine temperature is less than the threshold temperature, method 700 proceeds to 716 and includes continuing supplying fuel to the combustor at the current fueling rate. As described above, the controller may continue to update the fueling rate as operating conditions and/or the desired output changes, but the fueling rate may not be adjusted to decrease the pre-turbine temperature while the pre-turbine temperature is less than the threshold temperature. Method 700 may then end.

In this way, a waste heat-driven air Brayton cycle turbocharger system is provided for injecting boost air in a rotary machine in an actively controllable manner. In some examples, the turbocharger system includes a water injection system and an auxiliary combustor for increasing an output of the turbocharger system, and thus a power output of the rotary machine, above a baseline level. In other examples, the turbocharger system includes either the water injection system or the auxiliary combustor. As a result of actuating the water injector to provide additional mass flow through turbines of the turbocharger system and/or actuating the auxiliary combustor to provide additional heat energy to the turbines of the turbocharger system, a size of the system may be reduced while a pressure and/or flow rate of the boost air may be increased. Further, by varying a rate of water injected by the water injection system and/or a fueling rate of fuel provided to the auxiliary combustor, the turbocharger system output may be increased to varying degrees.

The technical effect of injecting water into a compressed gas stream received by a heat exchanger before flowing to a turbocharger turbine in an air Brayton cycle injection system is that an efficiency of heat extraction from the heat exchanger is increased and a mass flow through the heat turbocharger turbine is increased, thereby increasing an operating point of the air Brayton cycle injection system above an equilibrium operating point.

The technical effect of operating a combustor positioned between an outlet of a heat exchanger and an inlet of a turbocharger turbine in an air Brayton cycle injection system is that supplemental heat is provided for driving the turbocharger turbine, thereby increasing an operating point of the air Brayton cycle injection system above an equilibrium operating point.

An example system for use with a power generator having a rotary machine including a first combustor and an exhaust passage flowing exhaust gases from the first combustor comprises: a heat exchanger positioned in the exhaust passage; and a turbocharger system, comprising: at least one low pressure turbocharger including a low pressure turbine fluidly coupled to an outlet of the heat exchanger, the low pressure turbine adapted to receive gas flow from the heat exchanger, and a low pressure compressor fluidly coupled to an inlet of the heat exchanger, the low pressure compressor adapted to supply compressed air to the heat exchanger; at least one high pressure turbocharger including a high pressure turbine fluidly coupled to the outlet of the heat exchanger, the high pressure turbine adapted to receive gas flow from the heat exchanger, and a high pressure compressor fluidly coupled to the rotary machine, the high pressure compressor adapted to receive gas flow from the low pressure compressor and supply compressed air to the rotary machine; and an auxiliary, second combustor adapted to inject heated exhaust gases into a first flow path arranged between the outlet of the heat exchanger and an inlet to each of the high pressure turbine and the low pressure turbine. In a first example, the system further comprises a controller with computer readable instructions stored in memory, that when executed during operation of the power generation system, cause the controller to adjust a fueling rate of fuel supplied to the second combustor for combustion based on a desired power output of the rotary machine. In a second example of the system, which optionally includes the first example, the instructions further cause the controller to increase the fueling rate of fuel supplied to the second combustor in response to the desired power output increasing. In a third example of the system, which optionally includes one or both of the first and second examples, the instructions further cause the controller to decrease the fueling rate of fuel supplied to the second combustor in response to a gas temperature upstream of the high pressure turbine and low pressure turbine being at or greater than a threshold temperature. In a fourth example of the system, which optionally includes one or more or each of the first through third examples, the second combustor is fluidly coupled to a fuel source and is positioned in-line with the first flow path, the second combustor receiving air for combustion from the first flow path. In a fifth example of the system, which optionally includes one or more of each of the first through fourth examples, the second combustor is fluidly coupled to a fuel source and is positioned in a second flow path that joins the first flow path between the outlet of the heat exchanger and the inlet to each of the high pressure turbine and the low pressure turbine. A sixth example of the system optionally includes one or more or each of the first through fifth examples and further comprises an intercooler positioned in a compressed air flow path arranged between the low pressure compressor and the high pressure compressor, the intercooler adapted to cool compressed air flowing from the low pressure compressor to the high pressure compressor. In a seventh example of the system, which optionally includes one or more or each of the first through sixth examples, the rotary machine is a gas turbine engine further including a turbine section and a compressor section separate from turbocharger system and wherein the turbine section and compressor section rotate independently from the at least one low pressure turbocharger and the high pressure turbocharger. An eighth example of the system optionally includes one or more or each of the first through seventh examples and further comprises an electric compressor fluidly coupled upstream of an inlet of the at least one low pressure turbocharger and driven by electrical power received from an electric motor. A ninth example of the system optionally includes one or more or each of the first through eighth examples and further comprises a water injection system adapted to inject water into a third flow path arranged between the low pressure compressor and the inlet of the heat exchanger.

An example method for a turbocharger system for use with a power generating system, comprises: providing compressed air from a high pressure compressor of the turbocharger system to a first combustor of a rotary machine; extracting heat from exhaust gases flowing in an exhaust path of the first combustor via a heat exchanger and transferring the extracted heat to gases flowing through a heat exchanger gas flow path of the turbocharger system; flowing heated gases from the heat exchanger gas flow path to each of a low pressure turbine and a high pressure turbine of the turbocharger system, the low pressure turbine driving rotation of a low pressure compressor and the high pressure turbine driving rotation of the high pressure compressor; flowing compressed gases from the low pressure compressor to each of the high pressure compressor and the heat exchanger; and combusting fuel at a second combustor and injecting combusted gases from the second combustor into the heat exchanger gas flow path, downstream of the heat exchanger and upstream of each of the low pressure turbine and the high pressure turbine. A first example of the method further comprises adjusting a fueling rate of fuel provided to the second combustor for combustion based on a desired output of the turbocharger system. In a second example of the method, which optionally includes the first example, adjusting the fueling rate of fuel provided to the second combustor for combustion based on the desired output includes increasing the fueling rate as the desired output increases above a baseline level achieved while not combusting fuel at the second combustor. A third example of the method optionally includes one or both of the first and second examples and further comprises decreasing the fueling rate in response to a temperature upstream of each of the low pressure turbine and the high pressure turbine reaching a threshold temperature. A fourth example of the method optionally includes one or more or each of the first through third examples and further comprises injecting water into the compressed gases from the low pressure compressor via a water injector positioned upstream of the heat exchanger in response to a temperature upstream of each of the low pressure turbine and the high pressure turbine reaching a threshold temperature.

An example method for a turbocharger system for use with a power generation system, comprises: adjusting each of a rate of water injected into a first gas flow path to a heat exchanger positioned in an exhaust flow path of a rotary machine and a fueling rate to a first combustor, the first combustor injecting combusted gases into a second gas flow path arranged between an outlet of the heat exchanger and an inlet to each of a high pressure turbine and low pressure turbine of the turbocharger system, where the turbocharger system further includes a low pressure turbine supplying compressed air to the heat exchanger via the first gas flow path and driven by the low pressure turbine and a high pressure compressor driven by the high pressure turbine and supplying compressed gases to a second combustor of the rotary machine. In a first example of the method, adjusting each of the rate of water injected into the first gas flow path and the fueling rate to the first combustor is based on a desired power output of the rotary machine. In a second example of the method, which optionally includes the first example, adjusting each of the rate of water injected into the first gas flow path and the fueling rate to the first combustor is further based on water and fuel availability of a water injection system and a fuel injection system for the first combustor, respectively. In a third example of the method, which optionally includes one or both of the first and second examples, adjusting each of the rate of water injected into the first gas flow path and the fueling rate to the first combustor comprises: while no water is injected into the first gas flow path, increasing the fueling rate to the first combustor as a desired power output of the rotary machine increases until a temperature upstream of the high pressure turbine reaches a threshold; and in response to the temperature upstream of the high pressure turbine reaching the threshold, injecting water into the first flow path. A fourth example of the method optionally includes one or more or each of the first through third examples and further comprises, while injecting water into the first flow path, adjusting the rate of water injected into the first gas flow path based on the temperature upstream of the high pressure turbine and further increasing the fueling rate to the first combustor until the desired power output of the rotary machine is achieved.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by a control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the controller, where the described actions are carried out by executing the instructions in a system including the various system hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for use with a power generator having a rotary machine including a first combustor and an exhaust passage flowing exhaust gases from the first combustor, comprising:
    a heat exchanger positioned in the exhaust passage;
    a turbocharger system, comprising:
        at least one first turbocharger including a first turbine fluidly coupled to an outlet of the heat exchanger, the first turbine adapted to receive gas flow from the heat exchanger, and a first compressor fluidly coupled to an inlet of the heat exchanger, the first compressor adapted to supply compressed air to the heat exchanger;
        at least one second turbocharger including a second turbine fluidly coupled to the outlet of the heat exchanger, the second turbine adapted to receive gas flow from the heat exchanger, and a second compressor fluidly coupled to the rotary machine, the second compressor adapted to receive gas flow from the first compressor and supply compressed air to the rotary machine; and
        an auxiliary, second combustor adapted to inject heated exhaust gases into a first flow path arranged between the outlet of the heat exchanger and an inlet to each of the second turbine and the first turbine; and
    a controller with computer readable instructions stored in memory, that when executed during operation of the power generator, cause the controller to adjust a fueling rate of fuel supplied to the second combustor for combustion based on a desired operating point for a desired power output of the rotary machine.

2. The system of claim 1, wherein the instructions further cause the controller to increase the fueling rate of fuel supplied to the second combustor in response to the desired power output increasing.

3. The system of claim 2, wherein the instructions further cause the controller to decrease the fueling rate of fuel supplied to the second combustor in response to a gas temperature upstream of the second turbine and first turbine being at or greater than a threshold temperature.

4. The system of claim 1, wherein the second combustor is fluidly coupled to a fuel source and is positioned in-line with the first flow path, the second combustor receiving air for combustion from the first flow path.

5. The system of claim 1, wherein the second combustor is fluidly coupled to a fuel source and is positioned in a second flow path that joins the first flow path between the outlet of the heat exchanger and the inlet to each of the second turbine and the first turbine.

6. The system of claim 1, further comprising an intercooler positioned in a compressed air flow path arranged between the first compressor and the second compressor, the intercooler adapted to cool compressed air flowing from the first compressor to the second compressor.

7. The system of claim 1, wherein the rotary machine is a gas turbine engine further including a turbine section and a compressor section separate from turbocharger system and wherein the turbine section and compressor section rotate independently from the at least one first turbocharger and the second turbocharger.

8. The system of claim 1, further comprising an electric compressor fluidly coupled upstream of an inlet of the first compressor of the at least one first turbocharger and driven by electrical power received from an electric motor.

9. The system of claim 1, further comprising a water injection system adapted to inject water into a third flow path arranged between the first compressor and the inlet of the heat exchanger.

10. A method for a turbocharger system for use with a power generating system, comprising:
providing compressed air from a first compressor of the turbocharger system to a first combustor of a rotary machine;
extracting heat from exhaust gases flowing in an exhaust path of the first combustor via a heat exchanger and transferring the extracted heat to gases flowing through a heat exchanger gas flow path of the turbocharger system;
flowing heated gases from the heat exchanger gas flow path to each of a first turbine and a second turbine of the turbocharger system, the second turbine driving rotation of a second compressor and the first turbine driving rotation of the first compressor;
flowing compressed gases from the second compressor to each of the first compressor and the heat exchanger;
combusting fuel at a second combustor and injecting combusted gases from the second combustor into the heat exchanger gas flow path, downstream of the heat exchanger and upstream of each of the second turbine and the first turbine;
adjusting a fueling rate of fuel provided to the second combustor for combustion based on a desired output of the turbocharger system; and
injecting water into the compressed gases from the second compressor via a water injector positioned upstream of the heat exchanger in response to a temperature upstream of each of the second turbine and the first turbine reaching a threshold temperature.

11. The method of claim 10, wherein adjusting the fueling rate of fuel provided to the second combustor for combustion based on the desired output includes increasing the fueling rate as the desired output increases above a baseline level achieved while not combusting fuel at the second combustor.

12. The method of claim 10, further comprising decreasing the fueling rate in response to a temperature upstream of each of the second turbine and the first turbine reaching a threshold temperature.

13. A method for a turbocharger system for use with a power generation system, comprising:
adjusting each of a rate of water injected into a first gas flow path to a heat exchanger positioned in an exhaust flow path of a rotary machine and a fueling rate to a first combustor, the first combustor injecting combusted gases into a second gas flow path arranged between an outlet of the heat exchanger and an inlet to each of a second turbine and first turbine of the turbocharger system, where the turbocharger system further includes first compressor supplying compressed air to the heat exchanger via the first gas flow path and driven by the first turbine and a second compressor driven by the second turbine and supplying compressed gases to a second combustor of the rotary machine,
wherein adjusting each of the rate of water injected into the first gas flow path and the fueling rate to the first combustor is based on a desired power output of the rotary machine.

14. The method of claim 13, wherein adjusting each of the rate of water injected into the first gas flow path and the fueling rate to the first combustor is further based on water and fuel availability of a water injection system and a fuel injection system for the first combustor, respectively.

15. The method of claim 13, wherein adjusting each of the rate of water injected into the first gas flow path and the fueling rate to the first combustor comprises:
while no water is injected into the first gas flow path, increasing the fueling rate to the first combustor as a desired power output of the rotary machine increases until a temperature upstream of the second turbine reaches a threshold; and
in response to the temperature upstream of the second turbine reaching the threshold, injecting water into the first flow path.

16. The method of claim 15, further comprising, while injecting water into the first flow path, adjusting the rate of water injected into the first gas flow path based on the temperature upstream of the second turbine and further increasing the fueling rate to the first combustor until the desired power output of the rotary machine is achieved.

17. The method of claim 1, wherein to adjust the fueling rate of fuel supplied to the second combustor for combustion, the controller increases or decreases the fueling rate over an operating range of the second combustor.

18. The method of claim 1, wherein the fueling rate of fuel supplied to the second combustor for combustion spans a range of fueling rates.

* * * * *